(12) United States Patent
Lopez Mendez et al.

(10) Patent No.: US 11,164,386 B2
(45) Date of Patent: Nov. 2, 2021

(54) MOTION SENSING

(71) Applicant: Arm Limited, Cambridge (GB)

(72) Inventors: Roberto Lopez Mendez, Cambridge (GB); Daren Croxford, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/829,964

(22) Filed: Mar. 25, 2020

(65) Prior Publication Data

US 2020/0226840 A1 Jul. 16, 2020

Related U.S. Application Data

(63) Continuation of application No. PCT/GB2018/052552, filed on Sep. 7, 2018.

(30) Foreign Application Priority Data

Oct. 2, 2017 (GB) .................................... 1716052

(51) Int. Cl.
*G06T 19/00* (2011.01)
*A63F 13/211* (2014.01)
*A63F 13/26* (2014.01)

(52) U.S. Cl.
CPC .......... *G06T 19/006* (2013.01); *A63F 13/211* (2014.09); *A63F 13/26* (2014.09); *A63F 2300/8082* (2013.01)

(58) Field of Classification Search
CPC .................................................. G06T 19/006
See application file for complete search history.

(56) References Cited

U.S. PATENT DOCUMENTS 9,298,283 B1 3/2016 Lin et al.
2011/0264303 A1* 10/2011 Lenser ................. G05D 1/0038
701/2
2014/0267403 A1 9/2014 Maciocci et al.
(Continued)

FOREIGN PATENT DOCUMENTS

WO 2015123774 A1 8/2015

OTHER PUBLICATIONS

United Kingdom Combined Search and Examination Report dated Mar. 14, 2018 for GB Application No. 1716052.4.
(Continued)

*Primary Examiner* — Phi Hoang
(74) *Attorney, Agent, or Firm* — EIP US LLP

(57) ABSTRACT

A computing device 2, such as a general-purpose smartphone or general-purpose tablet computing device, comprises one or more inertial sensors and an image sensor. The device 2 produces stereoscopic images of a virtual environment on the display during a virtual reality (VR) session controlled by a user of the computing device. The device conducts visual odometry using at least image data received from the image sensor, and selectively activates and deactivates the visual odometry according to activity of the user during the virtual reality session. When the visual odometry is activated, the device controls the virtual reality session by at least position information from the visual odometry. When the visual odometry is deactivated, the device controls the virtual reality session by at least orientation information from the one or more inertial sensors.

16 Claims, 2 Drawing Sheets

(56) References Cited

U.S. PATENT DOCUMENTS

| | | | |
|---|---|---|---|
| 2015/0185018 A1* | 7/2015 | Hesch | G06T 7/246 |
| | | | 701/501 |
| 2015/0317834 A1 | 11/2015 | Poulos et al. | |
| 2017/0132806 A1* | 5/2017 | Balachandreswaran | |
| | | | G06K 9/623 |
| 2017/0153646 A1* | 6/2017 | Shin | G05D 1/0274 |
| 2017/0164802 A1 | 6/2017 | Cudzilo | |
| 2017/0177090 A1* | 6/2017 | Anderson | G06T 19/006 |
| 2017/0220119 A1 | 8/2017 | Potts et al. | |
| 2017/0278306 A1 | 9/2017 | Rico | |
| 2017/0302847 A1* | 10/2017 | Kim | H04N 5/23216 |
| 2018/0139565 A1* | 5/2018 | Norris | H04S 1/007 |
| 2018/0196265 A1* | 7/2018 | Bouchier | G03H 1/2294 |
| 2018/0246565 A1* | 8/2018 | Moon | G06F 3/017 |
| 2018/0284882 A1* | 10/2018 | Shipes | G02B 27/017 |
| 2019/0027113 A1* | 1/2019 | Kaine | G09G 5/005 |
| 2019/0387209 A1* | 12/2019 | Yang | H04N 13/128 |
| 2020/0011668 A1* | 1/2020 | Derby | G06K 9/6211 |

OTHER PUBLICATIONS

United Kingdom Combined Search and Examination Report dated Nov. 27, 2018 for GB Application No. 1716052.4.
International Search Report and Written Opinion dated Nov. 14, 2018 for PCT Application No. PCT/GB2018/052552.

\* cited by examiner

MOTION SENSING

CROSS-REFERENCE TO RELATED APPLICATIONS

This application is a continuation of International Patent Application No. PCT/GB2018/052552 filed Sep. 7, 2018, which claims priority to United Kingdom Patent Application No. 1716052.4, filed on Oct. 2, 2017 under 35 U.S.C. § 119(a). Each of the above-referenced patent applications is incorporated by reference in its entirety.

BACKGROUND OF THE INVENTION

Field of the Invention

The present disclosure relates to computer-implemented methods relating to, and computing devices capable of, motion sensing.

Description of the Related Technology

It is known to provide computing devices with inertial sensors, such as inertial measurement units (IMUs), for the purpose of detecting the orientation of a device. An output from an IMU may be used for virtual reality (VR) applications, to detect changes in orientation of the head of a user when a device is mounted to a head of a user. This allows a computing device to provide the user with a display of a virtual environment which is altered in response to detected changes in orientation of the head of the user. Detecting changes in orientation of the head of the user, which may be referred to as sensing of orientational motion, thus allows the user to control their view of the virtual environment.

It is desired to allow a computing device to detect not just changes in the device's orientation, but also changes in the device's position, which may be referred to as sensing of positional motion. A user may then move positionally through a virtual environment by real-world positional motion rather than through less natural user input via a control interface.

A challenge is to detect a device's position with an accuracy and/or frequency sufficient for various applications, whilst conserving computing resources and/or power. This challenge is increased for VR applications, due to the considerable demands of VR environment generation and image rendering. It is a particular challenge for VR applications which execute on mobile computing devices, such as general-purpose smartphones and general-purpose tablet computing devices, which have relatively small amounts of available computing resources and/or power.

SUMMARY

In accordance with one aspect, there is provided a computer-implemented method in a computing device comprising: one or more inertial sensors; an image sensor; and a display, the method comprising, during a VR session controlled by a user of the computing device: producing stereoscopic images of a virtual environment on the display; conducting visual odometry using at least image data received from the image sensor; selectively activating and deactivating the visual odometry according to activity of the user during the VR session; controlling the VR session by at least position information from the visual odometry when the visual odometry is activated; and controlling the VR session by at least orientation information from the one or more inertial sensors when the visual odometry is deactivated.

In accordance with another aspect, there is provided a computer-implemented method in a computing device comprising: one or more inertial sensors; and an image sensor, the method comprising: conducting visual odometry using at least image data received from the image sensor; selectively deactivating the visual odometry according to activity of a user of the computing device; and receiving data characteristic of positional motion of the computing device from the one or more inertial sensors when the visual odometry is deactivated, and to activate the visual odometry in response to the received data.

In accordance with another aspect, there is provided a computing device comprising: one or more inertial sensors; an image sensor; a display; data storage comprising computer executable instructions; and one or more processors configured to execute the instructions, to cause the computing device to, during a VR session controlled by a user of the computing device: produce stereoscopic images of a virtual environment on the display; conduct visual odometry using at least image data received from the image sensor; selectively activate and deactivate the visual odometry according to activity of the user during the VR session; control the VR session by at least position information from the visual odometry when the visual odometry is activated; and control the VR session by at least orientation information from the one or more inertial sensors when the visual odometry is deactivated.

In accordance with another aspect, there is provided a computing device comprising: one or more inertial sensors; an image sensor; data storage comprising computer executable instructions; and one or more processors configured to execute the instructions, to cause the computing device to: conduct visual odometry using at least image data received from the image sensor; selectively deactivate the visual odometry according to activity of the user; and receive data characteristic of positional motion of the computing device from the one or more inertial sensors when the visual odometry is deactivated, and to activate the visual odometry in response to the received data.

Further aspects and features will become apparent from the following description, given by way of example only, which is made with reference to the accompanying drawings.

DETAILED DESCRIPTION OF CERTAIN INVENTIVE EMBODIMENTS

Details of examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
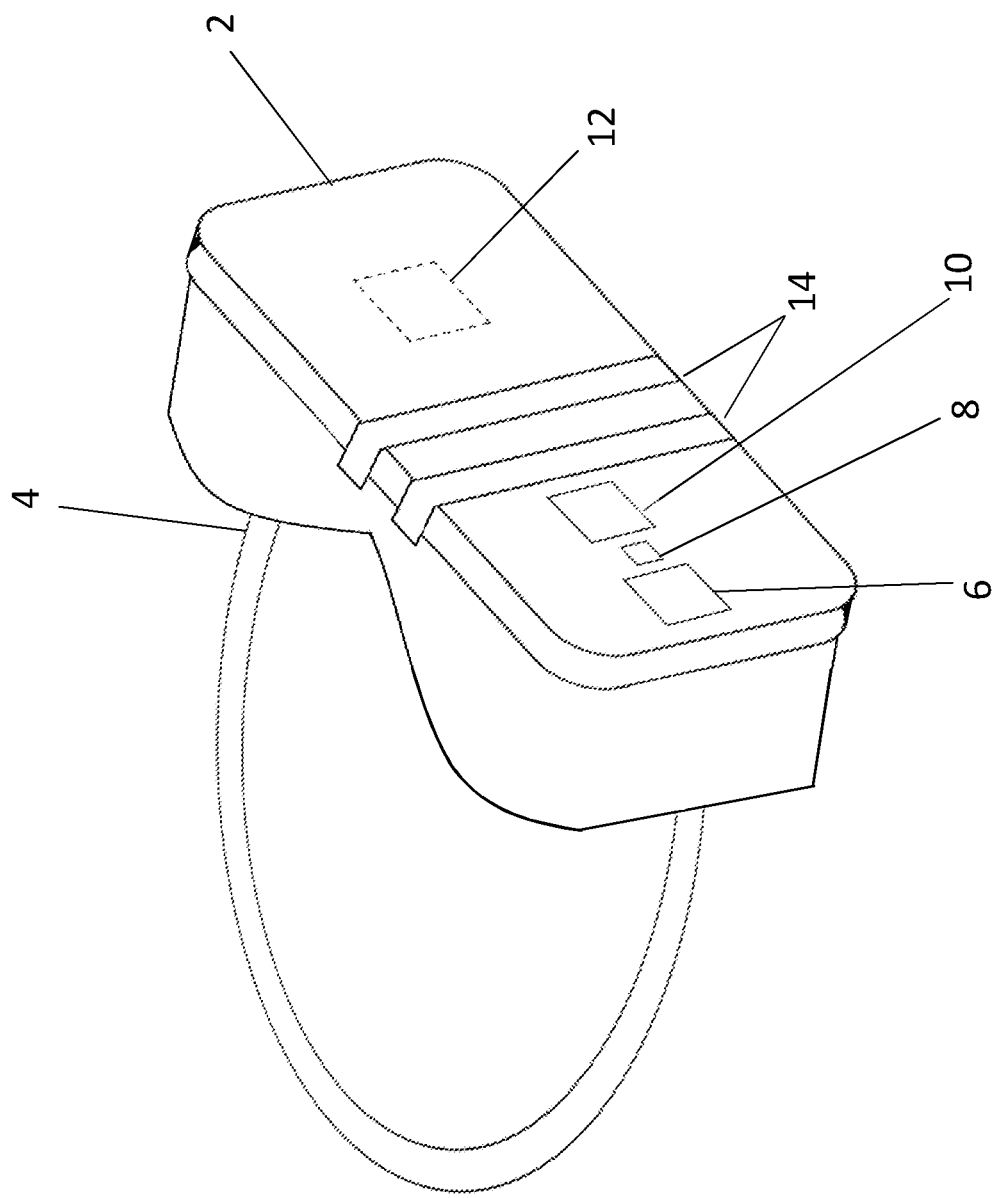
FIG. 1 is a schematic illustration of a headset-mounted computing device according to examples.

Referring to FIG. 1, examples described herein provide a computing device 2, in the form of a general-purpose smartphone or general-purpose tablet computing device. The device may be an Android™ or Apple iOS™ device.

Examples described herein include a separate headset 4, to which the computing device may be removably mounted.

The computing device 2 includes a first rear-mounted image sensor 6, such as a wide-angle fish-eye camera. A second rear-mounted image sensor 8 is also provided, for example in the form of an infra-red camera equipped with an infra-red radiation emitter to enable structure light or time of flight depth sensing of objects in view. Other methods of depth sensing may alternatively be used, for example stereo depth sensing using two camera outputs. A third rear-mounted image sensor 10 is also provided, such as a narrow-angle camera, for conventional picture-taking. At least the first rear-mounted image sensor 6 is used for outputting image data to a visual odometry system, as will be described in further detail below. The visual odometry may be monocular. A further wide-angle fish-eye camera (not shown) may be provided for stereoscopic visual odometry. The outputs of the second and third image sensors 8 and 10 may in either case be used as supplemental inputs to the visual odometry.

The computing device 2 includes one or more inertial sensors, such as an IMU 12. It is to be understood that reference to the IMU 12 below may include reference to one or more IMUs. Each IMU may include one or more of a set of three orthogonally mounted gyroscopes, a set of three orthogonally mounted accelerometers, and/or a set of three orthogonally mounted magnetometers. Each IMU may report three degrees of freedom (DoFs) of orientation data, three DoFs of positional data, or both (in which case six DoFs of data are reported) to the visual odometry system and/or the VR system of the device, as will be described in further detail below. A current position and orientation according to each of the six DoFs may be referred to as a pose.

The separate headset 4 includes a mounting mechanism 14, for example mechanical clips, via which the computing device may be removably mounted to the headset 4. The mounting mechanism 14 does not cover the rear of the computing device, so as to provide an unobstructed forward-facing view to the three image sensors 6, 8 and 10, in particular the image sensor(s) used for visual odometry.

One or more separate hand-held control devices (not shown) can be associated with the computing device 2, for example by wireless pairing, which allows a user to conduct manual user input. This user input may be used for example to start the VR session, to provide input representative of user activity during the VR session, and to end the VR session.

The computing device includes data storage comprising computer executable instructions and one or more processors, for example a central processing unit (CPU), a graphics processing unit (GPU) and/or other processors, which may be combined as a System on a Chip (SoC) or onto multiple SoCs to form one or more application processors.

In examples, a VR system is provided on the device, in the form of one or more software and/or hardware modules. The VR system may be accessed via operating system commands from a VR application when the VR application is running. The VR system may for example be part of a Google Daydream™, or a Samsung Gear VR™, compatible operating system installed on the device. The VR system on the computing device renders, for each frame of a video frame sequence, a single image comprising two, side-by-side, stereoscopic images of a virtual environment on the display screen during a VR session generated controlled by real-world movement of a user of the computing device. The VR application and/or the VR system may also provide audio output and/or other output, such as haptic output to the user, as the user moves through the virtual environment. The VR application may be developed using a VR game development platform, for example, the Unity™ game development platform.

A VR session may started on the computing device by the user launching a VR application, to enter the virtual environment, and may be ended by the user closing the VR application. Alternatively, a VR session may started on the computing device by the user entering a virtual environment, after launching a VR application, and may be ended by the user exiting the virtual environment, at the same time or prior to the user closing the VR application. During a VR session, movement through the virtual environment is governed by a character controller, which represents the view of the user of the computing device 2 in the virtual environment. Movement of the character controller, i.e. changes in pose of the character controller in the virtual environment, is achieved through sensing by the device of orientational and positional motion of the computing device 2 in the real world, and optionally or alternatively through user input via a separate control device associated with the computing device 2. A real-world pose of the device may be detected, and motion in the visual environment may be controlled accordingly so that a similar, or identical, virtual-world pose may be used in the virtual environment. Alternatively, one or more characteristics of the real-world pose of the computing device 2 may be inhibited, and motion in the virtual environment may be controlled accordingly. The real-world pose may be used selectively during a VR session. Positional motion detected in the real world may be scaled to positional motion in the virtual world using a constant or variable scaling factor. When scaling is used, the scaling factor is preferably greater than one, so that for example small steps by a user in the real world are scaled to large steps of the user in the virtual environment. The scaling factor may be varied, for example by user input via a separate controller, during a VR session.

A visual odometry system is provided on the computing device 2, in the form of one or more software and/or hardware modules. The visual odometry system conducts visual odometry using at least image data received from the image sensor. The visual odometry is performed at least in part by processing image data received from one or more image sensors on the computing device 2, in one example the image sensor 6. The image data is received typically on a captured frame-by-frame basis, to identify features in the real world environment captured by the image sensor, and to track the motion of the image sensor relative to those features as the device moves in the real world environment. The visual odometry may be visual-inertial odometry, in which the image sensor data is supplemented, or fused, with data from at least one inertial sensor, such as an IMU on the device. The visual odometry system may be implemented as any one of a variety of known visual odometry algorithms, and may for example be provided by an augmented reality (AR) platform, such as Google Tango™, Google ARCore™ or Apple ARKit™, installed on the computing device 2.

The computing device 2 includes a front-facing display screen (not shown), such as a high-resolution active-matrix organic light-emitting diode (AMOLED) display screen, on which the stereoscopic VR images are displayed, side-by-side, during a VR session.

The device is configured, at least during a VR session, to selectively activate and deactivate the visual odometry according to activity of the user during the VR session, whilst orientational and/or positional motion continues to be detected via the IMU 12. When the character controller adopts a positionally static pose in the virtual environment, the visual odometry may be deactivated, whilst real-world orientational and/or positional motion of the computing device 2 continues to be detected via the IMU 12. When the character controller state is changed to a state in which positional motion is possible, the visual odometry may be re-activated, whilst orientational and/or positional motion continues to be detected via the IMU 12 and used to supplement, or is fused with, the visual odometry data. The output from the IMU 12 may be used to conduct visual-inertial odometry.

The user activity on which basis the activation and deactivation may occur includes monitoring of real-world positional motion of the head-mounted device 2, and/or user input via a separate control device during the VR session.

A slowdown or stop in positional motion of the head-mounted device 2 may be detected using visual odometry. Alternatively, or in addition, it may be detected by using an output from the IMU, which may provide a measurement characteristic of such a slowdown or stop in positional motion. It may for example be detected in response to a measured characteristic representative of a rate of change of position falling below a threshold value. In response, visual odometry is deactivated, whilst orientation and/or position may continue to be detected using the IMU 12. In this state, orientation detection by the IMU 12 may be used to control the orientation of the character controller in the virtual environment, whilst positional changes detection by the IMU 12 may be used to control re-activation of a state in which the character controller moves positionally in the virtual environment, and to trigger corresponding re-activation of the visual odometry.

In addition, or in an alternative example, the user may be provided with an option, activated by user input via the controller, for the character controller to adopt a positionally static pose. In this state, orientation in the virtual environment may continue to be determined by real-world orientational motion detection. This state may for example be initiated by the user at specific locations and/or areas in the virtual environment, and/or throughout the virtual environment (by different forms of user input). In response, visual odometry is deactivated, whilst orientation and/or position may continue to be detected using the IMU 12. In this state, orientational motion detection by the IMU 12 may be used to control the orientation of the character controller in the virtual environment, whilst positional changes detection by the IMU 12 may be used to control re-activation of a state in which the character controller moves positionally in the virtual environment, and to trigger corresponding re-activation of the visual odometry.

In addition, or in a further alternative example, the virtual environment may include locations and/or areas, which locations and/or areas are arrived at due to user activity, in which the character controller automatically comes to a standstill, i.e. remain positionally static. In response, visual odometry is deactivated, whilst orientation and/or position may continue to be detected using the IMU 12. In this state, orientational motion detection by the IMU 12 may be used to control the orientation of the character controller in the virtual environment, whilst positional motion detection by the IMU 12 may be used to control re-activation of a state in which the character controller moves positionally in the virtual environment, and to trigger corresponding re-activation of the visual odometry.

After taking a positionally static pose, positional motion of the character controller in the virtual environment may be re-activated subsequently, which may correspondingly re-activate visual odometry. The visual odometry system is then used to accurately detect movement of the device in the real world which may be used to control the motion of the character controller in the virtual environment, at least until further user activity indicates that the character controller is again to take a positionally static pose.

Re-activation of positional motion of the character controller in the virtual environment may be triggered by detection of an increase of positional motion of the head-mounted device 2. It may for example be detected using an output from the IMU, which may provide a measurement characteristic of such an increase of positional motion. It may for example be detected in response to a measured characteristic representative of a rate of change of position rising above a threshold value, which may be different to the threshold value for detecting a slowdown or stop in positional motion described above. In response, visual odometry is re-activated, whilst orientation and/or position may continue to be detected using the IMU 12. In this state, orientation detection by the IMU 12 and/or by the visual odometry system may be used to control the orientation of the character controller in the virtual environment, whilst positional motion detection by the IMU 12 and/or by the visual odometry system may be used to control the character controller's positional motion in the virtual environment.

Alternatively, or in addition, re-activation of positional motion of the character controller in the virtual environment may be triggered by user input via a separate control device. In response, visual odometry is re-activated, whilst orientation and/or position may continue to be detected using the IMU 12. In this state, orientation detection by the IMU 12 and/or by the visual odometry system may be used to control the orientation of the character controller in the virtual environment, whilst positional motion detection by the IMU 12 and/or by visual odometry system may be used to control the character controller's positional motion in the virtual environment.

The VR session is controlled by at least position information from the visual odometry when the visual odometry is activated during a VR session, and by at least orientation information from the one or more inertial sensors when the visual odometry is deactivated during a VR session. The computing device of the first examples therefore allows a VR session to utilize visual odometry selectively, according to user activity. This can improve the operation of the device, allowing the device to reduce its computing resource and/or power requirements.

A manner in which user activity may activate and/or deactivate the visual odometry system may include receiving a command from the VR application resulting from user activity. Such a command may indirectly result from user activity, and may be triggered by motion in the virtual environment caused by detection of motion of the user in the real-world and/or user input via a separate control device.

Figure 2:
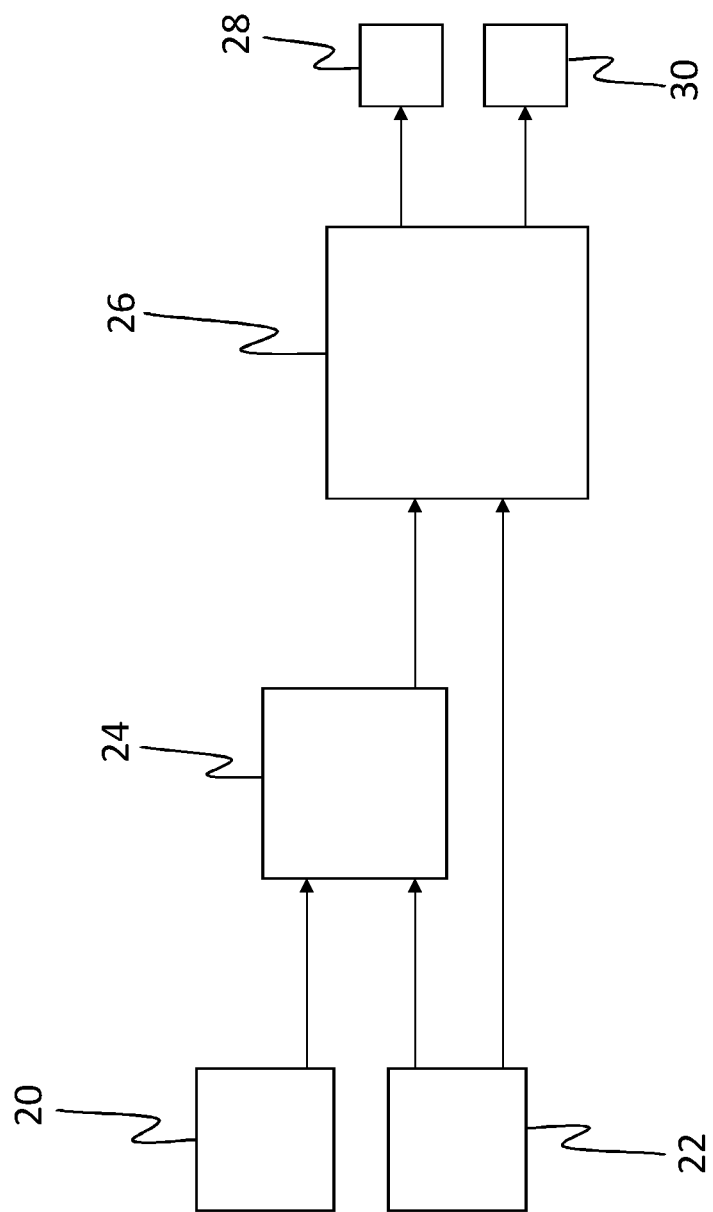
FIG. 2 is a schematic illustration of features of a computing device according to examples.

FIG. 2 is a schematic illustration according to examples of features of a computing device and data flows during a VR session. An image capture device 20 and an IMU 22 each provide respective output data to a visual-inertial odometry system 24.

The image capture device 20 provides image data, in the form of a series of video frames, to visual-inertial odometry system 24, for feature tracking to allow the visual-inertial odometry system 24 to determine positional motion, and optionally orientational motion.

The IMU 22 provides sensed motion data, in the form of data characteristic of at least orientational motion and optionally also data characteristic of positional motion, to visual-inertial odometry system 24, to allow the visual-inertial odometry system 24 to supplement, or fuse, its visual data with orientational motion, and optionally positional motion, derived from the output of the IMU 22.

The visual-inertial odometry system 24 provides data indicative of positional motion, and optionally orientational motion, to the VR system 26, for use in determining movement of a character controller during a VR session as described above. The VR system 26, in turn provides output images, in the form of a sequence of output video frames, to a display screen 26 and provides other output(s) to other output device(s) 30 such as audio output to a loudspeaker and/or haptic output to a haptic unit, etc.

When the visual-inertial odometry system 24 is activated and deactivated, correspondingly, the image sensor 20 may also be synchronously switched on and off, in order to save further computing resources and/or power during the VR session.

The IMU 22 also provides sensed motion data, in the form of data characteristic of at least orientational motion and optionally also data characteristic of positional motion, to the VR system 26, for use in determining movement of a character controller during a VR session as described above. When the visual-inertial odometry system 24 is deactivated, the IMU 22 continues to provide sensed motion data to the VR system 26.

In further examples, the VR system 26 may receive supplemental positional and/or orientational motion data from one or more separate sensor devices remote from the computing device, and control the VR session using input from these separate sensor devices. These may for example be additional wearable IMUs worn on parts of the user's body other than the head. This enables positional and/or orientational pose information regarding these body parts to be transmitted when the VR environment is shared with other users. Such supplemental data may be transmitted to other users to allow movement of the parts of the user's body other than the head to be represented to such other users in their respective VR sessions. The supplemental data may be transmitted whilst the user has a positionally static pose in the shared virtual environment, and can be provided whilst the visual odometry system is inactive.

The above examples are to be understood as illustrative examples. Further examples are envisaged. In the examples described above, activation and deactivation of the visual-inertial odometry system 24 according to user activity is enabled throughout a VR session. It may also be enabled according to a resource and/or power-saving requirement of the device or the VR application itself. The device or the VR application may issue a command to initiate a resource and/or power-saving mode. When the command is issued, the device alters from a mode in which the visual-inertial odometry system 24 remains active throughout a VR session, to a resource and/or power-saving mode in which the activation and deactivation of the visual-inertial odometry system 24 according to user activity is enabled during a VR session.

In the examples described above, the computing device is a general-purpose smartphone or general-purpose tablet computing device, which has particular constraints on power and/or resources, and which require a separate headset mounting. However, examples also relate to VR-specific, all-in-one, headsets.

Furthermore, examples are not restricted to VR systems, and may for example be used in augmented reality (AR) systems or other location based systems. In such examples, the inertial sensors are used to control the activation and/or deactivation of the visual odometry system, and there is provided a computing device comprising: one or more inertial sensors; an image sensor; data storage comprising computer executable instructions; and one or more processors configured to execute the instructions, to cause the computing device to: conduct visual odometry using at least image data received from the image sensor; selectively deactivate the visual odometry according to activity of the user; and receive data characteristic of positional motion of the computing device from the one or more inertial sensors when the visual odometry is deactivated, and to activate the visual odometry in response to the received data.

Note, in relation to the above examples, visual odometry may be conducted via more than one of the image sensors. Furthermore, some visual odometry may be conducted independently of other visual odometry. Examples include activating and deactivating visual odometry associated with one image sensor in accordance with user activity, but continuing visual odometry associated with other image sensors. Such examples of activation and deactivation of some, but not all, visual odometry, can result in resource and/or power-saving, whilst maintaining at least some visual odometry functionality throughout a VR session.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A computer-implemented method in a computing device comprising:
    one or more inertial sensors;
    an image sensor; and
    a display,
    the method comprising, during a virtual reality session controlled by a user of the computing device:
    producing stereoscopic images of a virtual environment on the display;
    conducting visual odometry using at least image data received from the image sensor;
    selectively activating and deactivating the visual odometry according to activity of the user during the virtual reality session, wherein selectively activating and deactivating the visual odometry comprises detecting positional motion of the computing device due to movement activity of the user, and wherein deactivation of visual odometry occurs when a rate of change of positional motion falls below a deactivation threshold value, and wherein activation of visual odometry occurs when a rate of change of positional motion rises above an activation threshold value;
    controlling the virtual reality session by at least position information from the visual odometry when the visual odometry is activated; and controlling the virtual reality session by at least orientation information from the one or more inertial sensors when the visual odometry is deactivated.

2. A method according to claim 1, wherein selectively activating and deactivating the visual odometry comprises:
receiving a command from a virtual reality application generating the virtual environment, the command being generated according to user activity during the virtual reality session; and
selectively activating and/or deactivating the visual odometry in response to the received command.

3. A method according to claim 1, wherein selectively activating and deactivating the visual odometry comprises receiving input from the user during the virtual reality session, and selectively activating and/or deactivating the visual odometry in response to the received user input.

4. A method according to claim 3, wherein the user input is received from a user input device separate to the computing device.

5. A method according to claim 1, wherein the visual odometry comprises visual-inertial odometry and wherein the method comprises conducting visual-inertial odometry using at least image data received from the image sensor and data characteristic of positional motion of the computing device from at least one of the one or more inertial sensors.

6. A method according to claim 1, wherein the visual odometry comprises feature tracking based on a frame-by-frame analysis of image data received from the image sensor.

7. A method according to claim 1, wherein the image sensor comprises a fish-eye lens camera.

8. A method according to claim 1, wherein the computing device comprises a general-purpose smartphone or general-purpose tablet device.

9. A method according to claim 1, wherein the one or more inertial sensors comprise one or more inertial measurement units.

10. A method according to claim 1, comprising receiving supplemental position data including at least position information from one or more sensor devices separate from the computing device, and controlling the virtual reality session in accordance with the received supplemental position data whilst visual odometry is activated.

11. A method according to claim 1, comprising selectively activating and deactivating the image sensor in correspondence with selectively activating and deactivating the visual odometry according to activity of the user during the virtual reality session.

12. A method according to claim 1, wherein the deactivation threshold value and the activation threshold value are the same value.

13. A method according to claim 1, wherein the deactivation threshold value and the activation threshold value are different values.

14. A computer-implemented method in a computing device comprising:
one or more inertial sensors; and
an image sensor,
the method comprising:
conducting visual odometry using at least image data received from the image sensor;
selectively deactivating the visual odometry according to activity of a user of the computing device, wherein selectively deactivating the visual odometry comprises detecting positional motion of the computing device due to movement activity of the user, and wherein deactivation of visual odometry occurs when a rate of change of positional motion falls below a deactivation threshold value; and
receiving data characteristic of positional motion of the computing device from the one or more inertial sensors when the visual odometry is deactivated, and to activate the visual odometry in response to the received data, wherein activation of visual odometry occurs when a rate of change of positional motion rises above an activation threshold value.

15. A computing device comprising:
one or more inertial sensors;
an image sensor;
a display;
data storage comprising computer executable instructions; and
one or more processors configured to execute the instructions, to cause the computing device to, during a virtual reality session controlled by a user of the computing device:
produce stereoscopic images of a virtual environment on the display;
conduct visual odometry using at least image data received from the image sensor;
selectively activate and deactivate the visual odometry according to activity of the user during the virtual reality session, wherein selectively activating and deactivating the visual odometry comprises detecting positional motion of the computing device due to movement activity of the user, and wherein deactivation of visual odometry occurs when a rate of change of positional motion falls below a deactivation threshold value, and wherein activation of visual odometry occurs when a rate of change of positional motion rises above an activation threshold value;
control the virtual reality session by at least position information from the visual odometry when the visual odometry is activated; and
control the virtual reality session by at least orientation information from the one or more inertial sensors when the visual odometry is deactivated.

16. A computing device comprising:
one or more inertial sensors;
an image sensor;
data storage comprising computer executable instructions; and
one or more processors configured to execute the instructions, to cause the computing device to:
conduct visual odometry using at least image data received from the image sensor;
selectively deactivate the visual odometry according to activity of the user, wherein selectively deactivating the visual odometry comprises detecting positional motion of the computing device due to movement activity of the user, and wherein deactivation of visual odometry occurs when a rate of change of positional motion falls below a deactivation threshold value; and
receive data characteristic of positional motion of the computing device from the one or more inertial sensors when the visual odometry is deactivated, and to activate the visual odometry in response to the received data, wherein activation of visual odometry occurs when a rate of change of positional motion rises above an activation threshold value.

* * * * *